US007817986B2

(12) United States Patent
Bonta et al.

(10) Patent No.: US 7,817,986 B2
(45) Date of Patent: Oct. 19, 2010

(54) METHOD AND SYSTEM FOR PROVIDING CELLULAR ASSISTED SECURE COMMUNICATIONS OF A PLURALITY OF AD HOC DEVICES

(75) Inventors: Jeffrey D. Bonta, Arlington Heights, IL (US); Hong-Yon Lach, Charenton-le-Pont (FR); Bharat Bhargava, West Lafayette, IN (US); Xiaoxin Wu, Beijing (CN)

(73) Assignees: Motorola, Inc., Schaumburg, IL (US); Purdue University, West Lafayette, IN (US)

( * ) Notice: Subject to any disclaimer, the term of this patent is extended or adjusted under 35 U.S.C. 154(b) by 481 days.

(21) Appl. No.: 11/380,809

(22) Filed: Apr. 28, 2006

(65) Prior Publication Data

US 2007/0253376 A1 Nov. 1, 2007

(51) Int. Cl.
*H04L 9/32* (2006.01)
*H04L 9/08* (2006.01)
*H04K 1/00* (2006.01)
*H04M 1/66* (2006.01)

(52) U.S. Cl. ............... 455/411; 713/176; 713/171; 380/278; 380/279; 380/284; 380/30

(58) Field of Classification Search ........... 455/410, 455/411, 41.2, 41.3; 713/169; 379/142.05; 380/278, 279, 284, 30
See application file for complete search history.

(56) References Cited

U.S. PATENT DOCUMENTS

2003/0028585 A1* 2/2003 Yeager et al. ............... 709/201
2003/0044020 A1* 3/2003 Aboba et al. ............... 380/278
2007/0253376 A1* 11/2007 Bonta et al. ............... 370/338

OTHER PUBLICATIONS

Bharat Bharvaga—A Novel Hierarchial Wireless Network: A Cellular Assisted Mobile Ad Hoc Network (CAMA)—Dept. of Computer Sciences, Purdue University—20pp—Date Required.
PCT/US07/66755, PCT Search Report and Written Opinion, mailed Sep. 23, 2008, 9 pages.
PCT/US2007/066755, PCT Preliminary Report on Patentability, mailed Nov. 6, 2008, 10 pages.
Australian Patent Office Rejection dated Jan. 14, 2010 - 2 pages.

* cited by examiner

*Primary Examiner*—Diane Mizrahi
(74) *Attorney, Agent, or Firm*—Randi L. Karpinia (57) ABSTRACT

A method for providing secure communications among a plurality of ad hoc devices includes authenticating one or more first devices within a first network; authenticating one or more second devices within a second network; transmitting a group key to the authenticated first devices and to the authenticated second devices; establishing an ad hoc network by at least one of the authenticated first devices and at least one of the authenticated second devices using the group key; and communicating within the ad hoc network among the at least one of the authenticated first devices and the at least one of the authenticated second devices.

19 Claims, 5 Drawing Sheets

METHOD AND SYSTEM FOR PROVIDING CELLULAR ASSISTED SECURE COMMUNICATIONS OF A PLURALITY OF AD HOC DEVICES

FIELD OF THE INVENTION

The present invention relates generally to wireless communication systems and in particular to secure communications among a plurality of ad hoc communication devices.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

Recently, there has been a growing interest in the integration of wireless networks. Examples of integrated networks include Advanced Mobile Phone Service (AMPS) combined with IS-95 cellular networks, Global Positioning System (GPS) applied in cellular networks, combined satellite and cellular networks, and combined cellular and wireless local area network (LAN) networks.

Recently, the integration of cellular networks and ad hoc networks is also gaining interest. It will be appreciated that the construction of ad hoc networks is dependent on an adequate density of ad hoc devices. It will further be appreciated that in an area where there is sufficient density of handsets capable of joining an ad hoc network, there may be a variety of handset manufacturers and a variety of handset service providers. One problem in this environment is that each service provider is not accustomed to participating or cooperating with other service providers. Therefore, any attempt to establish an ad hoc network that contains handsets from multiple service providers is likely to be blocked. One reason for blocking the ad hoc formation is concern for security of the service provider's subscribers and concern for unauthorized use of services provided by the service provider (e.g. a game or email service).

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing cellular assisted secure communications of a plurality of ad hoc devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of providing cellular assisted secure communications of a plurality of ad hoc devices described herein. The non-processor circuits may include, but are not limited to, a radio receiver, a radio transmitter, signal drivers, clock circuits, power source circuits, and user input devices. As such, these functions may be interpreted as steps of a method to perform cellular assisted secure communications of a plurality of ad hoc devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The present invention provides for the application of keys used in a hierarchical network (e.g. 802.11 ad hoc network overlaid with a wide area network containing a service center for key distribution). Specifically, the present invention uses a hierarchical key structure to enable private applications to utilize relays from like and unlike service operators or from only like service operators. The method includes periodic refresh of keys to exclude non-paying user's or bandit's keys. Several keys are managed by the handset and an overlay service center (e.g. cellular Home Location Register (HLR)). Each key has unique functionality that collectively enables peer-to-peer cooperation between handset devices, even if the handset devices have different manufacturers and/or different service providers.

Figure 1:
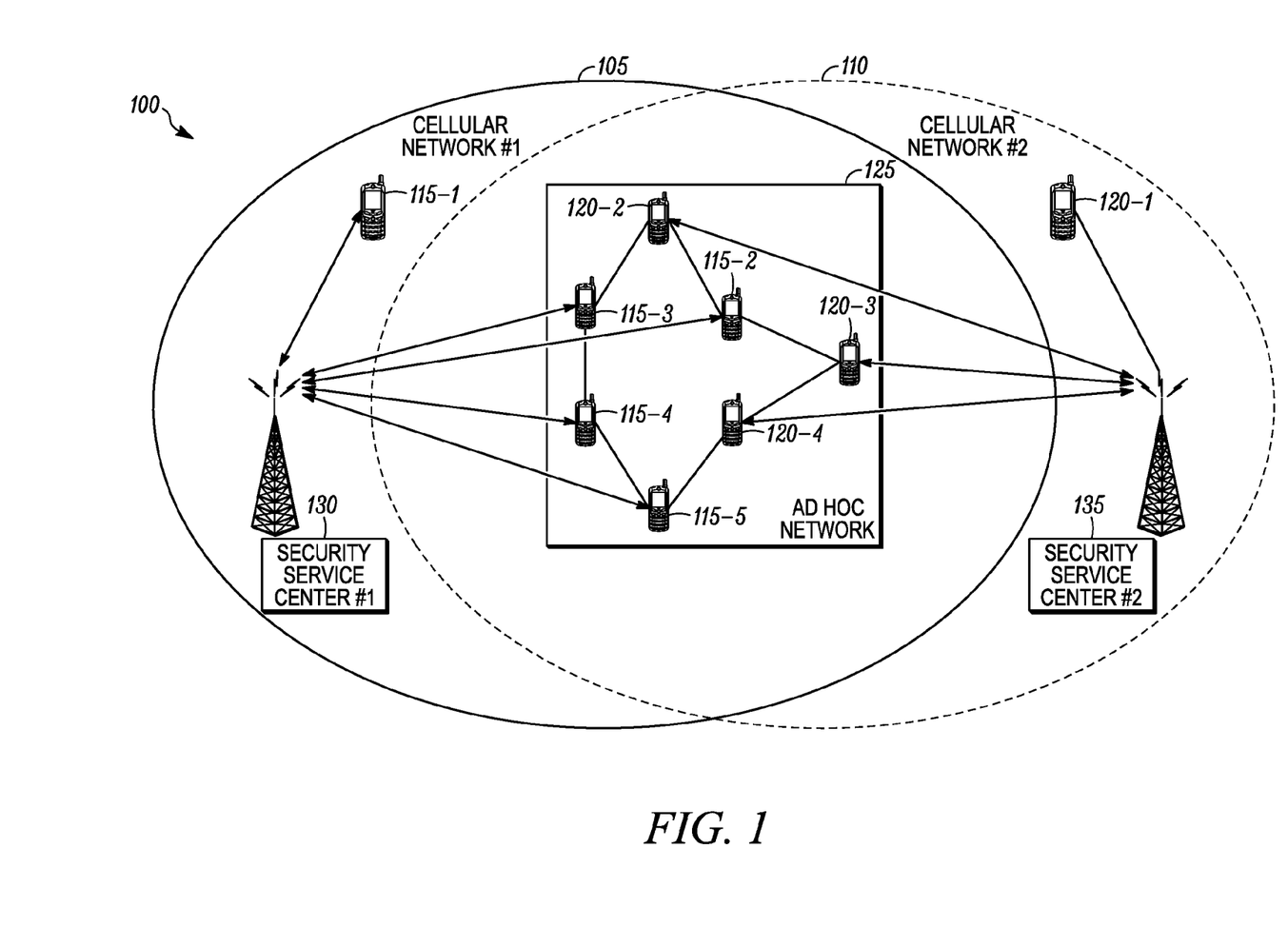
FIG. 1 is an exemplary communication network in accordance with some embodiments of the invention.

FIG. 1 is an exemplary communication network 100 in accordance with some embodiments of the invention. As illustrated, the communication network 100 is comprised of at least two cellular networks, a first cellular network 105 and a second cellular network 110. It will be appreciated by those of ordinary skill in the art that the communication network 100 can be comprised of any two or more communication networks including cellular networks (as illustrated), cordless telephone networks, wireless local area networks, two way radio networks and the like. It will further be appreciated that each of the networks within the communication network 100 can be operated by a unique service provider not associated with each other. Each service provider typically does not participate or cooperate with other service providers within the communication network.

It will be appreciated by those of ordinary skill in the art that the first cellular network 101 and the second cellular network 110 of FIG. 1 can operate in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-136 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. In the following description, the term "cellular network" refers to any of the systems mentioned above or an equivalent.

In accordance with the present invention, each of the cellular networks includes a security service center for managing secure communication within each cellular network. For example, the first cellular network 105 includes a first security service center 130 and the second cellular network 110 includes a second security service center 135.

As illustrated in FIG. 1, a plurality of communication devices operate within each of the two or more cellular networks. For example, communication devices 115-*n* (including 115-1, 115-2, 115-3, 115-4, 115-5 as illustrated) operate within the first cellular network 105. Similarly, communication devices 120-*n* (including 120-1, 120-2, 120-3, and 120-4 as illustrated) operate within the second cellular network 105. It will be appreciated by one of ordinary skill in the art that each of the communication devices 115-*n* and 120-*n* can be a mobile cellular telephone, a mobile radio data terminal, a mobile cellular telephone having an attached or integrated data terminal, a two-way messaging device, or an equivalent as appropriate for operating within each of the networks of the communication network 100. Similarly, the communication device can be any other electronic device such as a personal digital assistant or a laptop computer having wireless communication capabilities. In the following description, the term "communication device" refers to any combination of the devices mentioned above or an equivalent.

In accordance with the present invention, at least some of the communication devices 115-*n* are capable of communicating within more than one communication network such as the first cellular network 105 and an ad hoc network 125. For example, as illustrated in FIG. 1, communication devices 115-2, 115-3, 115-4, and 115-5 operate within both the first cellular network 105 and the ad hoc network 125. Similarly, at least some of the communication devices 120-*n* are capable of communicating within more than one communication network such as the second cellular network 110 and the ad hoc network 125. For example, as illustrated in FIG. 1, communication devices 120-2, 120-3, and 120-4 operate within both the second cellular network 110 and the ad hoc network 125.

It will be appreciated by those of ordinary skill in the art that the adhoc network 125 can be a mesh enabled architecture (MEA) network or an 802.11 network (i.e. 802.11a, 802.11b, or 802.11g) It will be appreciated by those of ordinary skill in the art that the ad hoc network 125 can alternatively comprise any packetized communication network. For example, the communication network 100 can be a network utilizing packet data protocols such as TDMA (time division multiple access), GPRS (General Packet Radio Service) and EGPRS (Enhanced GPRS).

The ad hoc network 125 includes a plurality of mobile nodes (referred to generally as nodes or mobile nodes or communication devices) such as the communication devices 115-3, 115-4, 115-5, 120-2, 120-3, and 120-4 as illustrated in FIG. 1. Further, the ad hoc network can, but is not required to, include a fixed network having a plurality of intelligent access points (IAP) for providing nodes with access to the fixed network (not shown). The fixed network 104 can include, for example, a core local access network (LAN), and a plurality of servers and gateway routers to provide network nodes with access to other networks, such as other ad-hoc networks, a public switched telephone network (PSTN) and the Internet. The ad hoc network 125 further can include a plurality of fixed routers for routing data packets between other nodes (not shown). It is noted that for purposes of this discussion, the nodes discussed above can be collectively referred to as "nodes" or alternatively as "communication devices."

As can be appreciated by one skilled in the art, the nodes within the ad hoc network 125 are capable of communicating with each other directly, or via one or more other nodes operating as a router or routers for packets being sent between nodes. Each node communicates with other neighboring nodes using a transmitting link and a receiving link associated with the node and each of the neighboring nodes.

Figure 2:
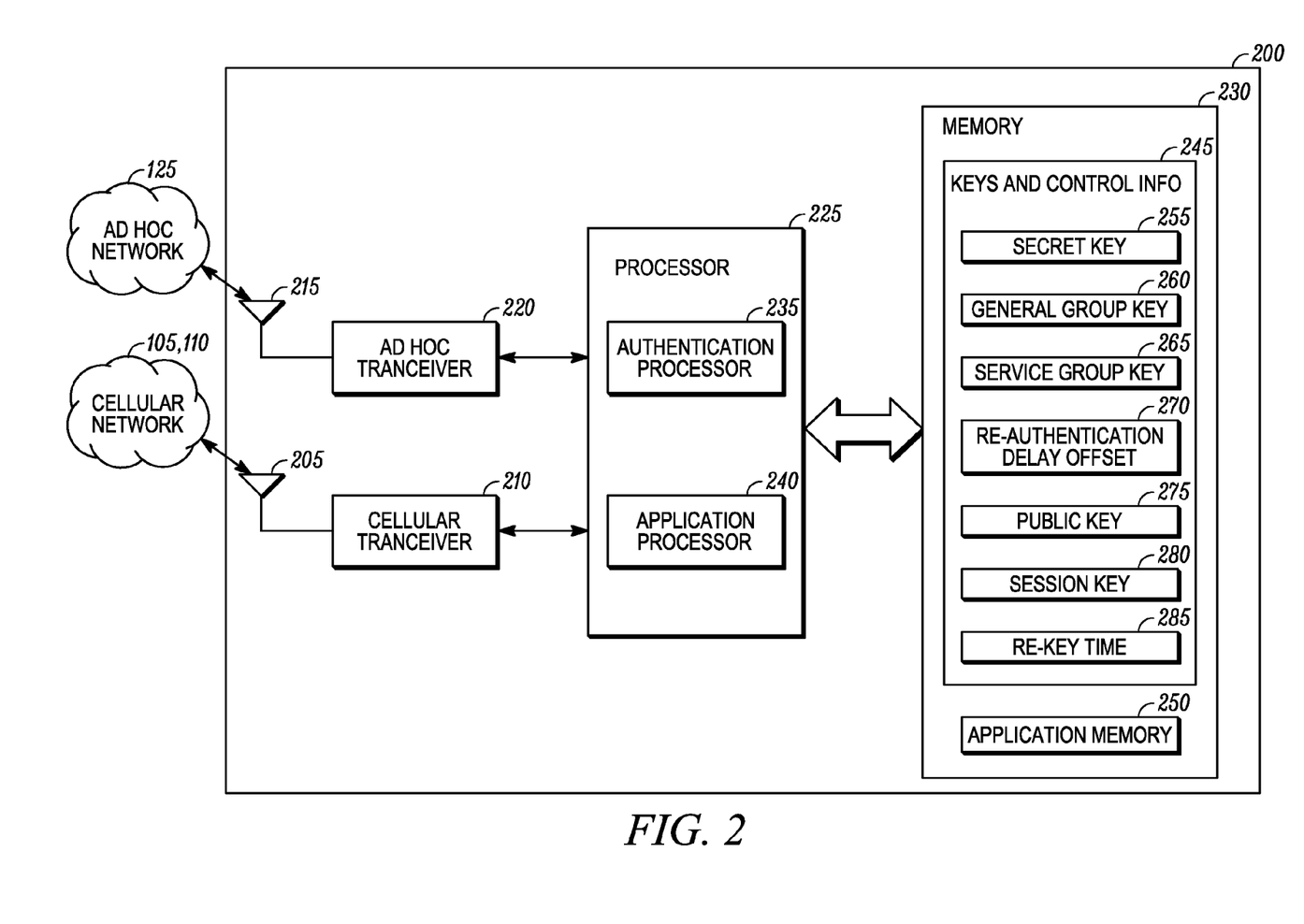
FIG. 2 is an exemplary communication device for operation within the communication network in accordance with some embodiments of the present invention.

FIG. 2 is an exemplary communication device 200 for operation within the communication network 100 in accordance with some embodiments of the present invention. The communication device 200, for example, can be a communication device 115-n and 120-n as illustrated in FIG. 1. In accordance with the present invention, the communication device 200 is a dual mode device. By way of example only, the communication device 200 can be capable of operation within both the ad hoc network 125 and one of the cellular networks 105, 110 of FIG. 1.

The communication device 200 includes conventional device hardware (not represented for simplicity) such as user interfaces, alert circuits, displays, and the like, that are integrated in a compact housing.

The communication device 200 further includes a cellular antenna 205 and a cellular transceiver 210 for communicating with the cellular network 105, 110. The cellular antenna 205 intercepts transmitted signals from one or more cellular networks 105, 110 and transmits signals to the one or more cellular networks 105, 110. The cellular antenna 205 is coupled to the cellular transceiver 210, which employs conventional demodulation techniques for receiving the communication signals. The cellular transceiver 210 is coupled to a processor 225 and is responsive to commands from the processor 225. When the cellular transceiver 210 receives a command from the processor 225, the cellular transceiver 210 sends a signal via the cellular antenna 205 to one or more of the cellular networks 105, 110. In an alternative embodiment (not shown), the communication device 200 includes a receive antenna and a receiver for receiving signals from one or more of the cellular networks 105, 110 and a transmit antenna and a transmitter for transmitting signals to one or more of the cellular networks 105, 110. It will be appreciated by one of ordinary skill in the art that other similar electronic block diagrams of the same or alternate type can be utilized for the cellular block of the communication device 200.

The communication device 200 further includes an ad hoc antenna 215 and an ad hoc transceiver 220 for communicating within the ad hoc network 125. The ad hoc antenna 215 intercepts transmitted signals from one or more nodes within the ad hoc network 125 and transmits signals to the one or more nodes within the ad hoc network 125. The ad hoc antenna 215 is coupled to the ad hoc transceiver 220, which employs conventional demodulation techniques for receiving and transmitting communication signals, such as packetized signals, to and from the communication device 200 under the control of the processor 225. The packetized data signals can include, for example, voice, data or multimedia information, and packetized control signals, including node update information. When the ad hoc transceiver 220 receives a command from the processor 225, the ad hoc transceiver 220 sends a signal via the ad hoc antenna 215 to one or more nodes within the ad hoc network 125. In an alternative embodiment (not shown), the communication device 200 includes a receive antenna and a receiver for receiving signals from the ad hoc network 125 and a transmit antenna and a transmitter for transmitting signals to the ad hoc network 125. It will be appreciated by one of ordinary skill in the art that other similar electronic block diagrams of the same or alternate type can be utilized for the ad hoc block of the communication device 200.

Coupled to the cellular transceiver 210 and the ad hoc transceiver 220, is the processor 225 utilizing conventional signal-processing techniques for processing received messages. It will be appreciated by one of ordinary skill in the art that additional processors can be utilized as required to handle the processing requirements of the processor 225.

In accordance with the present invention, the processor 225 includes an authentication processor 235 for authenticating various communications to and from the communication device 200. Further in accordance with the present invention, the processor 225 includes an application processor 240 for processing various software application programs within the communication device 200. It will be appreciated by those of ordinary skill in the art that the authentication processor 235 and the application processor 240 can each be hard coded or programmed into the communication device 200 during manufacturing, can be programmed over-the-air upon customer subscription, or can be a downloadable application. It will be appreciated that other programming methods can be utilized for programming each of the authentication processor 235 and the application processor 240 into the communication device 200. It will be further appreciated by one of ordinary skill in the art that each of the authentication processor 235 and the application processor 240 can be hardware circuitry within the communication device 200. In accordance with the present invention, each of the authentication processor 235 and the application processor 240 can be contained within the processor 225 as illustrated, or alternatively can be an individual block operatively coupled to the processor 225 (not shown).

To perform the necessary functions of the communication device 200, the processor 225 is coupled to the memory 230, which preferably includes a random access memory (RAM), a read-only memory (ROM), an electrically erasable programmable read-only memory (EEPROM), and flash memory.

The memory 230, in accordance with the present invention, includes storage locations for the storage of one or more keys and control information 245 and one or more applications 250. In accordance with the present invention, the one or more keys 245 can include, but are not limited to a secret key 255, a general group key 260, a service group key 265, a re-authentication delay offset 270, a public key 275, a session key 280, and a re-key time 285, each of which will be described in detail below.

It will be appreciated by those of ordinary skill in the art that the memory 230 can be integrated within the communication device 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the communication device 200.

Figure 3:
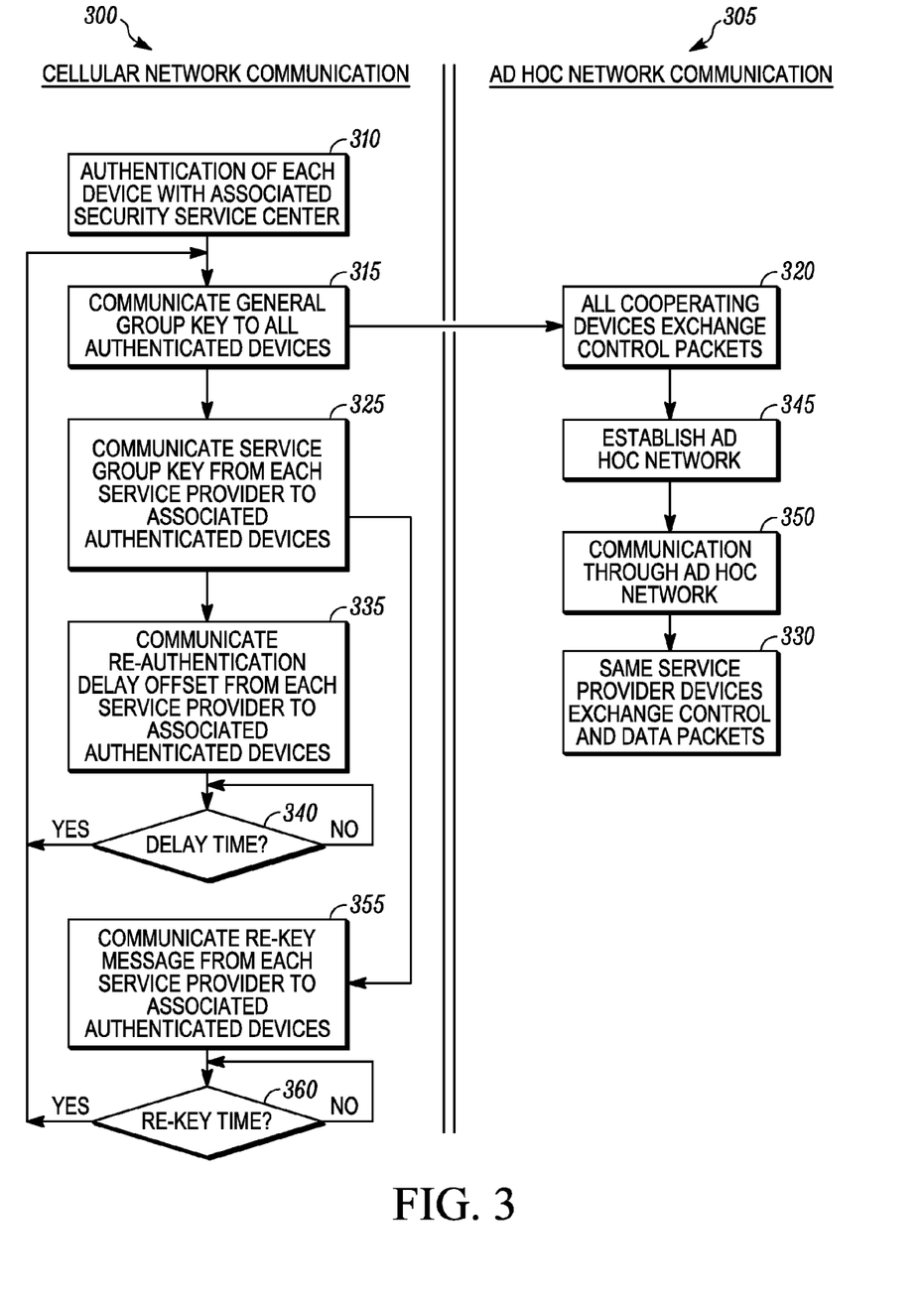
FIG. 3 is a flowchart illustrating an exemplary operation of the communication network of FIG. 1 in accordance with some embodiments of the present invention.

FIG. 3 is a flowchart illustrating an exemplary operation of the communication network of FIG. 1 in accordance with some embodiments of the present invention. As illustrated, some of the communications involved with the exemplary operation are cellular network communications 305, and some of the communications involved with the exemplary operation are ad hoc network communications 310.

The operation of FIG. 3 begins with Step 310 in which each communication device authenticates itself with the associated security service center of the cellular network in which it operates. For example, each of the communication devices 115-n authenticates itself with the first security service center 130 of the network 100. Similarly, each of the communication devices 120-n authenticates itself with the second security service center 135 of the network 100. Referring to the communication device 200, the authentication processor 235 retrieves the secret key 255 and the public key 275 from the memory 230, encrypts the public key 275 with the secret key 255, and sends the encrypted public key to the associated security service center via the cellular transceiver 210 and cellular antenna 205. In the present invention, the secret key 255 is embedded in the handset at the time of manufacture and is known only to the associated security service center. The associated security service center decrypts the public key 275 using its known copy of the secret key 255 and stores the public key for future use.

Next, in Step 315, a general group key is transmitted to all authenticated devices. The same general group key is transmitted to all authenticated communication devices within the network 100 irrespective of the service provider/cellular network in which the communication device operates. For example, the security service center 130 transmits the general group key to each communication device 115-$n$ in response to authentication of the communication device 115-$n$. Similarly, the security service center 135 transmits the general group key to each communication device 120-$n$ in response to authentication of the communication device 120-$n$. The general group key is encrypted using the secret key 255 corresponding to the communication device 115-$n$ or 120-$n$ that is being authenticated. In an alternate embodiment, the general group key is encrypted using the public key 275 corresponding to the communication device 115-$n$ or 120-$n$ that is being authenticated. Referring to the communication device 200, the encrypted general group key 260 is received via the cellular antenna 205 and cellular transceiver 210, decrypted by communication device 200, and stored by the processor 225 in the memory 230 for future use by the communication device. In accordance with the present invention, all communication devices operating within the ad hoc network 125 having the general group key 260 thereafter (Step 320) can use the general group key 260 to securely exchange control packets via the ad hoc network 125 with each other.

Next, in Step 325, each security service center transmits a service group key to all authenticated communication devices operating within the same cellular network. For example, the first security service center 130 transmits a first service group key to the authenticated communication devices 115-$n$; and the second security service center 130 transmits a second service group key to the authenticated communication devices 120-$n$. The service group key is encrypted using the secret key 255 corresponding to the communication device 115-$n$ or 120-$n$ that is being authenticated. In an alternate embodiment, the service group key is encrypted using the public key 275 corresponding to the communication device 115-$n$ or 120-$n$ that is being authenticated. Referring to the communication device 200, the encrypted service group key 265 is received via the cellular antenna 205 and cellular transceiver 210, decrypted by communication device 200, and stored by the processor 225 in the memory 230 for future use by the communication device 200. In accordance with the present invention, all communication devices operating within the same cellular network having the same service group key thereafter (Step 330) can use the service group key to securely exchange control and data packets via the ad hoc network with each other.

Next at step 335, each security service center transmits a re-authentication delay offset to all authenticated communication devices operating within the same cellular network. For example, the first security service center 130 transmits a first re-authentication delay offset to the authenticated communication devices 115-$n$; and the second security service center 130 transmits a second re-authentication delay offset to the authenticated communication devices 120-$n$. Referring to the communication device 200, the re-authentication delay offset 270 is received via the cellular antenna 205 and cellular transceiver 210, and stored by the processor 225 in the memory 230 for future use by the communication device 200. In accordance with the present invention, this re-authentication delay offset is selected at random for each authenticated communication device. It represents a delay time that the authenticated communication device must wait before it generates a new authentication request. At Step 340, when the current time is at least equal to the re-authentication delay offset time, the operation then cycles back to Steps 315 and 325. Then the re-authentication is generated after receiving a network broadcast to reestablish a general group key 260 and service group key 265. This method enables a periodic refresh of keys to exclude non-paying user's or bandit's keys.

Referring now back to the communication within the ad hoc network 125, after the general group key has been received by the various authenticated dual mode communication devices, the ad hoc network 125 can be established in Step 345 as is well known in the art. In other words, the ad hoc network 125 can be established to include communication devices 115-2, 115-3, 115-4, 115-5, 120-2, 120-3, and 120-4 using the general group key 260 for encrypting control packets for route discovery. Next, in Step 350 communication between the various participating devices in the ad hoc network 125 securely takes place via an associated ad hoc network communication channel. For example, the same service provider devices exchange control and data packets in Step 330.

It will be appreciated that periodically a new service group key and/or a new group general key will be transmitted to change the keys. In Step 355, the security service center broadcasts a re-key alert message to each communication device. This alert message contains a future re-key time by which all communication devices must have completed a re-authentication procedure. This future re-key time is later than the current time plus the maximum re-authentication delay offset received by any communication device. Referring to the communication device 200, the re-authentication delay offset 270 is used as a time offset from the current time whereby upon expiration, the communication device 200 will initiate a re-authentication procedure as previously defined in Steps 310, 315, and 325. The security service center will only authenticate those communication devices that are permitted to participate in the ad hoc network 125. As previously defined in Step 315, each security service center transmits a general group key to all authenticated communication devices operating within the network 100 irrespective of the service provider/cellular network in which the communication device operates. As previously defined in Step 325, each security service center transmits a service group key to all authenticated communication devices operating within the same cellular network. All keys received from the security service center are delivered to each communication device via a cellular control or data channel. In Step 360, each authenticated communication device determines whether or not the current time equals the communicated re-key time 285. When the current time is the re-key time 285, the process flows back to Step 315 and the communication device will begin using the new general group key and the new service group key for all future communications when the current time equals the re-key time 285. It will be appreciated by those of ordinary skill in the art that although FIG. 3 illustrates an exemplary embodiment in which the new general group key and the new service group key are communicated at or after the re-key time 285, alternatively, the new general group key and the new service group key can be communicated and stored within the communication devices at any time prior to the re-key time 285.

Figure 4:
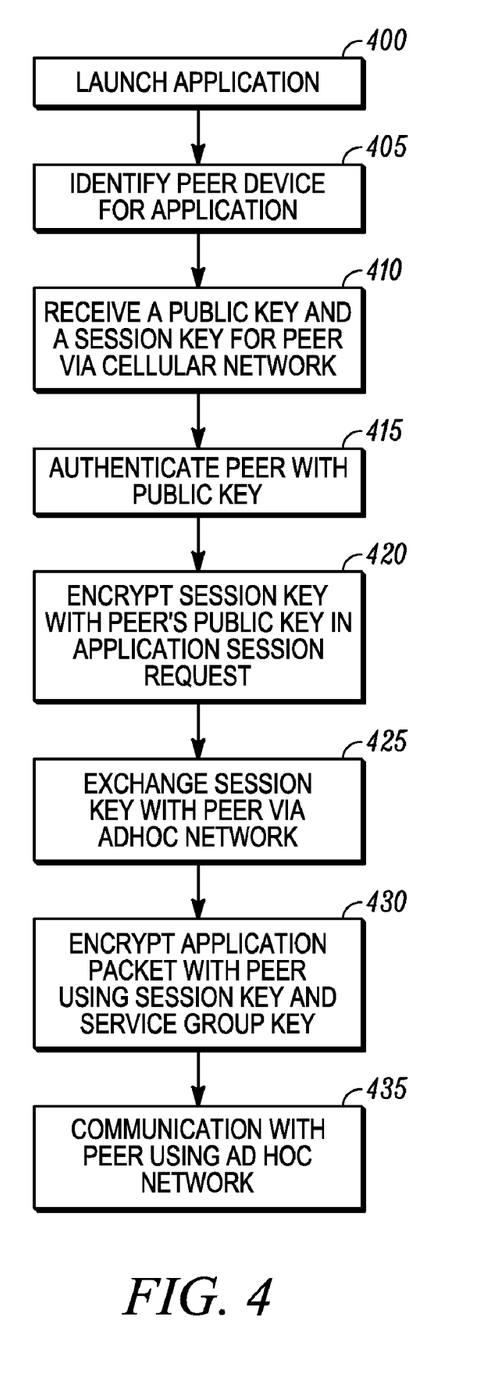
FIG. 4 is a flowchart illustrating an exemplary operation of the communication device of FIG. 2 in accordance with some embodiments of the present invention.

FIG. 4 is a flowchart illustrating an exemplary operation of the communication device 200 of FIG. 2 in accordance with some embodiments of the present invention. Specifically, FIG. 4 illustrates an exemplary operation of the communication step 350 of FIG. 3 in accordance with some embodiments of the present invention.

The operation of FIG. 4 begins with Step 400 in which the communication device 200 launches an application. For example, the application processor 240 launches an application stored in the application memory 250. Next, in Step 405, the communication device 200 identifies a peer device for the application. For example, the application processor 240 identifies the peer device from the stored application data stored in the application memory 250. Next, in Step 410, the communication device 200 receives a public key 275 and a session key 280 to share an application with the peer device via the cellular network in which the communication device and the peer device both operate. For example, a source communication device 200 requests use of the joint use of an application between itself and an identified peer device. The security service center transmits a session key and a public key for the peer device to the communication device (peer device public key and session key are encrypted with the public key of communication device 200). Next, in Step 415, the communication device 200 authenticates the peer device with the received public key. In one embodiment of the present invention, the data link communication headers and the network layer communication headers are encrypted with the general group key, the authentication request is encrypted with the service group key, and the content of the authentication request (e.g. public key of the source communication device 200) is encrypted with the peer device's public key. This enables any authenticated device in the ad hoc network (regardless of the cellular network that it belongs to) to route the authentication request to the peer device. In addition, the fact that an authentication is being attempted is known only to the communication devices in the cellular network that contains source communication device 200. It will be appreciated by those of ordinary skill in the art that other realizations of the use of these keys are also within the scope of the invention. The peer device will reply to the authentication request using the public key of the source communication device 200 as well as other keys as just described. Next, in Step 420, the communication device encrypts a session key with the peer device's public key in an application session request. Next, in Step 425, the communication device exchanges the session key with the peer device via the ad hoc network. By way of example in an embodiment of the present invention, the data link communication headers and the network layer communication headers are encrypted with the general group key, the application session request is encrypted with the service group key, and the content of the application session request (i.e. the session key) is encrypted with the peer device's public key. This enables any authenticated device in the ad hoc network (regardless of the cellular network that it belongs to) to route the application session request to the peer device. In addition, the fact that an application session request is being attempted is known only to the communication devices in the cellular network that contains source communication device 200. Furthermore, the session key is known only to the source communication device 200 and the peer device. It will be appreciated by those of ordinary skill in the art that other realizations of the use of these keys are also within the scope of the invention. Again, the peer device will reply to the application session request using the public key of the source communication device 200 as well as other keys as just described. Next, in Step 430, the communication device encrypts application packets with the peer device using the session key and the service group key received previously. Next, in Step 435, the communication device and the peer device communicate over the ad hoc network communication channel to process the various operations of the application. As exemplified previously, each of the general group key, service group key, public keys, and session key are used to securely communicate between the source communication device 200 and the peer device protecting elements of the communication deemed necessary by the communication device and the service provider for the communication devices.

Figure 5:
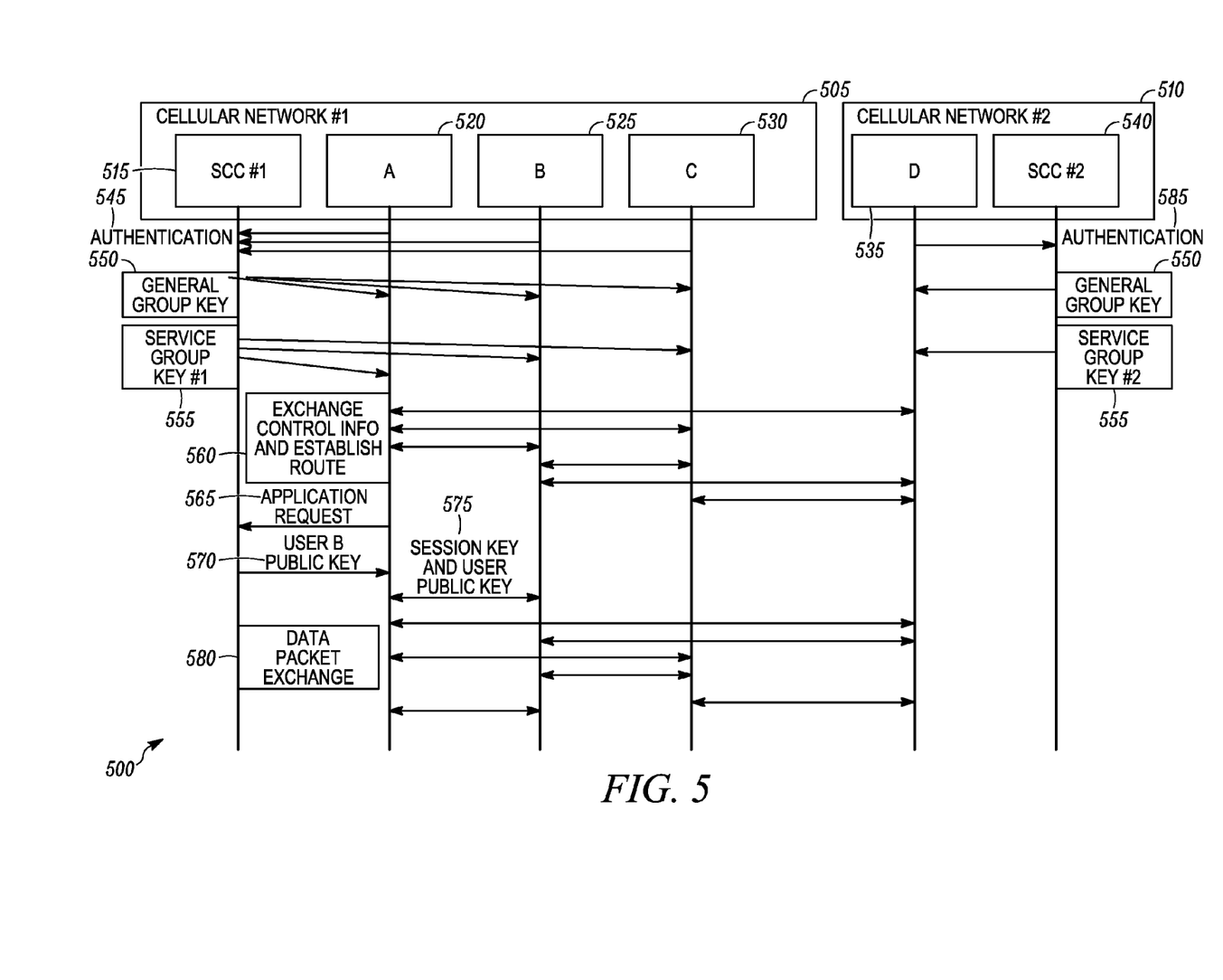
FIG. 5 is a message flow diagram illustrating an exemplary operation of the network of FIG. 1 in accordance with some embodiments of the present invention.

FIG. 5 is a message flow diagram illustrating an exemplary operation of a network 500 in accordance with some embodiments of the present invention. The network 500 includes a first cellular network 505 and a second cellular network 510. The first cellular network 505 includes a first security service center 515 and various communication devices including device A 520, device B 525 and device C 530. The second cellular network 510 includes a second security service center 540 and various communication devices including device D 535.

For purposes of the exemplary scenario of FIG. 5, two users, device A 520 and device B 525 want to share content via device C 530. As illustrated, device A 520, device B 525, and device C 530 all operate on the same cellular network (cellular network 505) using the same service provider. In this exemplary scenario, users A and B want their application data to be private, but they want device C to perform relays for them. Also, A, B, and C want all control and data to be secure from user D (device D 535 operating on a different cellular network 510). To enable this, device A 520, device B 525, and device C 530 each have a general group key and a first cellular network service group key that are also known by the first security service center 515. Device D 535 also knows the same general group key known by device A 520, device B 525, and device C 530, but only knows the second cellular network service group key. If device A 520, device B 525, and device C 530 want to use device D 535 as a relay, they would use the general group key for route discovery and raw packet relays through device D's Media Access Control (MAC) address, but would use the first cellular network service group key for higher layer control and data packets.

As illustrated in the operation flow of FIG. 5, in operation 545, each of device A 520, device B 525, device C 530, and device D 535 will initially power on and begin an authentication procedure using a secret key or certificate that is, for example, embedded in the handset at the time of manufacture. This authentication is performed with their respective security service center (i.e. the first security service center 515 for device A 520, device B 525, device C 530 and the second security service center 540 for device D 535). Next, in operation 550, once they are authenticated, each of device A 520, device B 525, device C 530, and device D 535 are assigned a general group key. Next, in operation 555, each of device A 520, device B 525, and device C 530 receive a service group key from the first security service center 515; and device D 535 receives a service group key from the second security service center 540.

Next, in operation 560, each of device A 520, device B 525, device C 530, and device D 535 uses the general group key to exchange control information and find a route from device A 520 to device B 525 through device C 530 and device D 535. Next, in operation 565, device A 520 exchanges a request with the first cellular service provider to start up an application (e.g. email with device B 525). Next, in operation 570, the first security service center 515 verifies that device B 525 is authorized to use the email service and then provides the public key for device B 525 to device A 520. Next, in operation 575, using this public key, device A 520 and device B 525 exchange a session key for the email application as well as the public key for device A 520. Next, in operation 580, using the first cellular network's service group key, the general group key, and the session key, data is encrypted at the appropriate level of encapsulation of the data packets being exchanged between device A 520 and device B 525 through device C 530 and device D 535 via a common ad hoc network as established in operation 560. Device C 530 and device D are not able to decode the data packets, but are fully capable of cooperating to serve the relay needs of device A 520 and device B 525.

Although not illustrated, it will be appreciated by those of ordinary skill in the art that at a later time, the first security service center 515 may broadcast a request to generate a new general group key, a new first cellular network service group key, or a new session key or application key to device A 520 and device B 525. This request specifies a future re-key time that all authenticated devices will update their respective keys. To accomplish the generation of new keys, the request will trigger each device A 520, device B 525, device C 530, and device D 535 to begin a new authentication procedure using their respective secret keys or certificates. The authentication of each device occurs at random points in time prior to the future re-key time. The random offset in time is based on a parameter received during the previous authentication. This operation is necessary to make sure that any non-paying subscriber is no longer to participate or eaves drop on ad hoc networks managed by the cellular network. Or, if either user A or B stopped paying for the email application, this updated application key also prevents them from using the application any longer.

The present invention as described herein provides a system and method to make it attractive and safe for handsets from one service provider to cooperate with handsets of another service provider to establish an ad hoc network and allow the relay of packets through its subscribers.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing secure communications among a plurality of ad hoc devices, the method comprising:
   authenticating one or more first devices within a first network;
   authenticating one or more second devices within a second network;
   transmitting a group key to the authenticated first devices and to the authenticated second devices;
   establishing an ad hoc network by at least one of the authenticated first devices and at least one of the authenticated second devices using the group key;
   communicating within the ad hoc network among the at least one of the authenticated first devices and the at least one of the authenticated second devices;
   communicating within the first network by the authenticated first devices using a first service group key; and
   communicating within the second network by the authenticated second devices using a second service group key.

2. A method as claimed in claim 1,
   wherein the first network comprises a first cellular network operated by a first service provider, and
   further wherein the second network comprises a second cellular network operated by a second service provider.

3. A method as claimed in claim 2,
   wherein the first network includes a first security service center, and further wherein the authenticating one or more first devices step comprises each of the one or more first devices authenticating itself with the first security service center; and
   further wherein the second network includes a second security service center, and further wherein the authenticating one or more second devices step comprises each of the one or more second devices authenticating itself with the second security service center.

4. A method as claimed in claim 3, further comprising:
   transmitting the first service group key from the first security service center to the authenticated first devices;
   transmitting the second service group key from the second security service center to the authenticated second devices.

5. A method as claimed in claim 1, wherein the establishing the ad hoc network step comprises the at least one of the authenticated first devices and the at least one of the authenticated second devices exchanging control packets encrypted with the group key for route discovery.

6. A method as claimed in claim 1, further comprising:
   transmitting a re-authentication delay offset time to the authenticated first devices; and
   re-authenticating the authenticated first devices at a time at least equal to the re-authentication delay offset time.

7. A method as claimed in claim 6, wherein the first network includes a first security service center, and wherein the transmitting the re-authentication delay offset step comprises:
   transmitting the re-authentication delay offset time from the first security service center to the authenticated first devices.

8. A method as claimed in claim 6, further comprising:
   transmitting a new general group key and a new service group key to the authenticated first devices prior to the re-authentication delay offset time; and
   operating the authenticated first devices using the new general group key and the new service group key after the re-authentication step.

9. A method as claimed in claim 1, further comprising:
   transmitting a re-authentication delay offset time to the authenticated second devices; and
   re-authenticating the authenticated second devices at a time at least equal to the re-authentication delay offset time.

10. A method as claimed in claim 9, wherein the second network includes a second security service center, and wherein the transmitting the re-authentication delay offset step comprises:
    transmitting the re-authentication delay offset from the second security service center to the authenticated second devices.

11. A method as claimed in claim 9, further comprising:
    transmitting a new general group key and a new service group key to the authenticated second devices prior to the re-authentication delay offset time; and operating the authenticated second devices using the new general group key and the new service group key after the re-authentication step.

12. A method as claimed in claim 1, further comprising:
   transmitting a re-key message including a re-key time to the authenticated first devices; and
   generating a re-authentication of at least one of the authenticated first devices when a current time is at least equal to the re-key time.

13. A method as claimed in claim 12, wherein the first network includes a first security service center, and wherein the transmitting the re-key message step comprises:
   transmitting the re-key message from the first security service center to the authenticated first devices.

14. A method as claimed in claim 1, further comprising:
   transmitting a re-key message to the authenticated second devices; and
   generating a re-authentication of at least one of the authenticated second devices when a current time is at least equal to the re-key time.

15. A method as claimed in claim 14, wherein the second network includes a second security service center, and wherein the transmitting the re-key message step comprises:
   transmitting the re-key message from the second security service center to the authenticated second devices.

16. A method of operation of a dual-mode communication device, the method comprising:
   authenticating the dual-mode communication device within a cellular network;
   receiving a general group key via the cellular network;
   communicating within an ad hoc network using the general group key to securely exchange control packets with one or more other devices operating within the ad hoc network;
   receiving a service group key from the security service center via the cellular network;
   and using the service group key to securely exchange control and data packets via the ad hoc network with one or more other cellular devices.

17. A method of operation of a dual-mode communication device as claimed in claim 16, further comprising:
   receiving a service group key from the security service center via the cellular network; and
   using the service group key to securely exchange control and data packets via the ad hoc network with one or more other cellular devices.

18. A method of operation of a dual-mode communication device as claimed in claim 16, wherein the authenticating step comprises:
   transmitting a secret key from the dual-mode communication device to a security service center via the cellular network.

19. A method of operation of a dual-mode communication device comprising:
   launching an application;
   identifying a peer device for the application;
   receiving a public key for the peer device via the cellular network in which the communication device and the peer device both operate;
   authenticating the peer device with the received public key;
   encrypting a session key with the peer device's public key;
   exchanging the session key and a dual-mode communication device public key with the peer device via the ad hoc network;
   encrypting application packets with the peer device using the session key and the service group key; and
   communicating with the peer device communicate over an ad hoc network communication channel to process the various operations of the application.

* * * * *

UNITED STATES PATENT AND TRADEMARK OFFICE
CERTIFICATE OF CORRECTION

| | |
|---|---|
| PATENT NO. | : 7,817,986 B2 |
| APPLICATION NO. | : 11/380809 |
| DATED | : October 19, 2010 |
| INVENTOR(S) | : Bonta et al. |

It is certified that error appears in the above-identified patent and that said Letters Patent is hereby corrected as shown below:

ON THE TITLE PAGE

Item (58), under "Field of Classification Search", in Column 1, Line 2, delete "713/169;" and insert -- 713/169, 171, 176; --, therefor.

IN THE DRAWINGS

In Fig. 4, Sheet 4 of 5, for Tag "425", in Line 3, delete "ADHOC" and insert -- AD HOC --, therefor.

IN THE SPECIFICATION

In Column 4, Line 34, delete "adhoc" and insert -- ad hoc --, therefor.

Signed and Sealed this
Thirty-first Day of July, 2012

David J. Kappos
*Director of the United States Patent and Trademark Office*